US012401960B2

(12) United States Patent
Vilermo et al.

(10) Patent No.: US 12,401,960 B2
(45) Date of Patent: Aug. 26, 2025

(54) APPARATUS FOR MAPPING SOUND SOURCE DIRECTION

(71) Applicant: Nokia Technologies Oy, Espoo (FI)

(72) Inventors: Miikka Tapani Vilermo, Siuro (FI); Hannu Juhani Pulakka, Pirkkala (FI)

(73) Assignee: Nokia Technologies Oy, Espoo (FI)

( * ) Notice: Subject to any disclaimer, the term of this patent is extended or adjusted under 35 U.S.C. 154(b) by 249 days.

(21) Appl. No.: 18/125,785

(22) Filed: Mar. 24, 2023

(65) Prior Publication Data

US 2023/0308821 A1 Sep. 28, 2023

(30) Foreign Application Priority Data

Mar. 25, 2022 (GB) ..................................... 2204269

(51) Int. Cl.
*H04R 5/00* (2006.01)
*H04R 3/00* (2006.01)
*H04R 5/027* (2006.01)
*H04S 7/00* (2006.01)

(52) U.S. Cl.
CPC ............... *H04S 7/30* (2013.01); *H04R 3/005* (2013.01); *H04R 5/027* (2013.01); *H04S 2400/11* (2013.01); *H04S 2400/13* (2013.01); *H04S 2400/15* (2013.01)

(58) Field of Classification Search
CPC .... H04S 7/30; H04S 2400/11; H04S 2400/13; H04S 2400/15; H04R 3/005; H04R 5/027
USPC ........................................................ 381/1, 92
See application file for complete search history.

(56) References Cited

U.S. PATENT DOCUMENTS

2013/0272097 A1 10/2013 Kim et al. .................... 367/129
2013/0275077 A1 10/2013 Kim et al.
2013/0300648 A1* 11/2013 Kim ...................... G04G 21/00
345/156
2015/0016641 A1 1/2015 Ugur et al.
2015/0126231 A1 5/2015 Ooka
2021/0255271 A1 8/2021 Sheng et al.

FOREIGN PATENT DOCUMENTS

WO WO 2009/107895 A1 9/2009
WO WO-2021/1761350 A1 9/2021

* cited by examiner

*Primary Examiner* — Ammar T Hamid
(74) *Attorney, Agent, or Firm* — McCarter & English LLP

(57) ABSTRACT

An apparatus for assisting spatial audio signal processing, the apparatus including circuitry configured to: capture, at least using at least three microphones in the apparatus, sensor data including microphone audio signals; analyse the sensor data to determine at least one three-dimension direction of a sound source; and process the sensor data to map the at least one three-dimension direction of the sound source to at least one further direction, wherein the processing of the sensor data is configured to employ at least a parasagittal plane based mapping.

21 Claims, 13 Drawing Sheets

APPARATUS FOR MAPPING SOUND SOURCE DIRECTION

FIELD

The present application relates to apparatus and methods for mapping sound source direction, but not exclusively for mapping sound source direction in visual and audio processing mapping of object direction from 3D to 2D in mobile devices.

BACKGROUND

Processing audio signals to focus audio to a direction has many use cases in mobile devices. For example in speech calls the user voice can be better separated from background noises. In video recording audio focussing can be employed to enable the audio to be zoomed (focused more) together with video zoom. In speech recognition a focussing operation can achieve better quality results as noise is removed. Furthermore in meeting recordings a focussing operation enables different participant voices to be (better) separated.

In a typical mobile device the number of microphones is at most three or four. Three microphones are always in a plane and often four microphones in mobile phones are placed so that they are substantially configured on a plane. When the microphones are on a plane but not in a line, the device can detect audio directions unambiguously in all directions on the plane. The device can also detect directions above and below the plane ambiguously. In other words the device is unable to determine whether the correct direction is above or below the plane. If there are four microphones configured or arranged so that they are not on single plane, then the device can detect all audio directions unambiguously.

Focusing audio means amplifying sound sources from a direction relative to sound sources in other directions. Beamforming and spatial filtering are known methods to achieve this. Focusing can be applied to the same directions and can have the same ambiguity as direction detection. In other words if a direction can be detected, then the device can be configured to 'focus' audio processing towards the detected direction.

SUMMARY

There is provided according to a first aspect an apparatus for assisting spatial audio signal processing, the apparatus comprising means configured to: capture, at least using at least three microphones in the apparatus, sensor data comprising microphone audio signals; analyse the sensor data to determine at least one three-dimension direction of a sound source; and process the sensor data to map the at least one three-dimension direction of the sound source to at least one further direction, wherein the processing of the sensor data is configured to employ at least a parasagittal plane based mapping.

The parasagittal plane based mapping may be configured to map the at least one three-dimension direction of the sound source to the at least one further direction associated with the sound source on a parasagittal plane common with the at least one three-dimension direction of the sound source.

The at least one further direction on the parasagittal plane common with the at least one three-dimension direction of the sound source may be at least one of: a three-dimension direction with an elevation value which is a negative of an elevation value of the at least three-dimension direction; a two-dimension direction with a zero elevation value.

The at least one further direction on the parasagittal plane common with the at least one three-dimension direction of the sound source may be at least one of: at least one direction defined by an intersection of a parasagittal plane defined by the at least one three-dimension direction with a defined two-dimension plane; and at least one direction defined by an intersection of a sphere with a radius defined by the at least one three-dimension direction and the parasagittal plane defined by the at least one three-dimension direction.

The processing of the sensor data may be configured to employ an azimuth map.

The azimuth map may be configured to map the at least one three-dimension direction of the sound source to the at least one further direction with an azimuth value in common with the at least one three-dimension direction of the sound source.

The at least one further direction with an azimuth value in common with the at least one three-dimension direction of the sound source may be at least one of: a three-dimension direction with an elevation value which is a negative of an elevation value of the at least three-dimension direction; a two-dimension direction with a zero elevation value.

The means may be further configured determine a mode of operation of the apparatus, and the means configured to process the sensor data to map the at least one three-dimension direction of the sound source to at least one further direction, wherein the processing of the sensor data is configured to employ at least a parasagittal plane based mapping may be configured to select from the parasagittal plane mapping and the azimuth mapping based on the determined mode of operation of the apparatus.

The means may be further configured to process the sensor data using either the at least one further direction or the at least one further direction and the at least one three-dimension direction.

The means configured to capture, using at least three microphones in the apparatus, sensor data may be further configured to capture the sensor data using at least one camera, wherein the sensor data further comprises image data.

The means configured to process the sensor data further may comprise at least one of: audio processing; and visual processing.

The audio processing may comprise audio focusing.

The visual processing may comprise enhancing visually the direction.

The further direction may be on a plane defined by at least three of the at least three microphones.

The at least one further direction may be on a horizontal plane.

The apparatus may be a mobile phone with the at least three microphones.

According to a second aspect there is provided a method for apparatus for assisting spatial audio signal processing, the method comprising: capturing, at least using at least three microphones in the apparatus, sensor data comprising microphone audio signals; analysing the sensor data to determine at least one three-dimension direction of a sound source; and processing the sensor data to map the at least one three-dimension direction of the sound source to at least one further direction, wherein the processing of the sensor data is configured to employ at least a parasagittal plane based mapping.

The parasagittal plane based mapping may comprise mapping the at least one three-dimension direction of the sound source to the at least one further direction associated with the sound source on a parasagittal plane common with the at least one three-dimension direction of the sound source.

The at least one further direction on the parasagittal plane common with the at least one three-dimension direction of the sound source may be at least one of: a three-dimension direction with an elevation value which is a negative of an elevation value of the at least three-dimension direction; a two-dimension direction with a zero elevation value.

The at least one further direction on the parasagittal plane common with the at least one three-dimension direction of the sound source may be at least one of: at least one direction defined by an intersection of a parasagittal plane defined by the at least one three-dimension direction with a defined two-dimension plane; and at least one direction defined by an intersection of a sphere with a radius defined by the at least one three-dimension direction and the parasagittal plane defined by the at least one three-dimension direction.

Processing of the sensor data may comprise employing an azimuth map.

The azimuth map may be configured to map the at least one three-dimension direction of the sound source to the at least one further direction with an azimuth value in common with the at least one three-dimension direction of the sound source.

The at least one further direction with an azimuth value in common with the at least one three-dimension direction of the sound source may be at least one of: a three-dimension direction with an elevation value which is a negative of an elevation value of the at least three-dimension direction; a two-dimension direction with a zero elevation value.

The method may further comprise determining a mode of operation of the apparatus, and processing the sensor data to map the at least one three-dimension direction of the sound source to at least one further direction, wherein the processing of the sensor data is configured to employ at least a parasagittal plane based mapping may comprise selecting from the parasagittal plane mapping and the azimuth mapping based on the determined mode of operation of the apparatus.

The method may further comprise processing the sensor data using either the at least one further direction or the at least one further direction and the at least one three-dimension direction.

Capturing, using at least three microphones in the apparatus, sensor data may be further comprise capturing the sensor data using at least one camera, wherein the sensor data further comprises image data.

Processing the sensor data further may comprise at least one of: audio processing; and visual processing.

The audio processing may comprise audio focusing.

The visual processing may comprise enhancing visually the direction.

The further direction may be on a plane defined by at least three of the at least three microphones.

The at least one further direction may be on a horizontal plane.

The apparatus may be a mobile phone with the at least three microphones.

According to a third aspect there is provided an apparatus for assisting spatial audio signal processing the apparatus comprising at least one processor and at least one memory including a computer program code, the at least one memory and the computer program code configured to, with the at least one processor, cause the apparatus at least to: capture, at least using at least three microphones in the apparatus, sensor data comprising microphone audio signals; analyse the sensor data to determine at least one three-dimension direction of a sound source; and process the sensor data to map the at least one three-dimension direction of the sound source to at least one further direction, wherein the processing of the sensor data is configured to employ at least a parasagittal plane based mapping.

The parasagittal plane based mapping may be configured to map the at least one three-dimension direction of the sound source to the at least one further direction associated with the sound source on a parasagittal plane common with the at least one three-dimension direction of the sound source.

The at least one further direction on the parasagittal plane common with the at least one three-dimension direction of the sound source may be at least one of: a three-dimension direction with an elevation value which is a negative of an elevation value of the at least three-dimension direction; a two-dimension direction with a zero elevation value.

The at least one further direction on the parasagittal plane common with the at least one three-dimension direction of the sound source may be at least one of: at least one direction defined by an intersection of a parasagittal plane defined by the at least one three-dimension direction with a defined two-dimension plane; and at least one direction defined by an intersection of a sphere with a radius defined by the at least one three-dimension direction and the parasagittal plane defined by the at least one three-dimension direction.

The apparatus caused to process of the sensor data may be further caused to employ an azimuth map.

The azimuth map may be configured to map the at least one three-dimension direction of the sound source to the at least one further direction with an azimuth value in common with the at least one three-dimension direction of the sound source.

The at least one further direction with an azimuth value in common with the at least one three-dimension direction of the sound source may be at least one of: a three-dimension direction with an elevation value which is a negative of an elevation value of the at least three-dimension direction; a two-dimension direction with a zero elevation value.

The apparatus may be further caused to determine a mode of operation of the apparatus, and the apparatus caused to process the sensor data to map the at least one three-dimension direction of the sound source to at least one further direction, wherein the processing of the sensor data is configured to employ at least a parasagittal plane based mapping may be caused to select from the parasagittal plane mapping and the azimuth mapping based on the determined mode of operation of the apparatus.

The apparatus may be further caused to process the sensor data using either the at least one further direction or the at least one further direction and the at least one three-dimension direction.

The apparatus caused to capture, using at least three microphones in the apparatus, sensor data may be further caused to capture the sensor data using at least one camera, wherein the sensor data further comprises image data.

The apparatus caused to process the sensor data further may be caused to perform at least one of: audio processing; and visual processing.

The audio processing may comprise audio focusing.

The visual processing may comprise enhancing visually the direction.

The further direction may be on a plane defined by at least three of the at least three microphones.

The at least one further direction may be on a horizontal plane.

The apparatus may be a mobile phone with the at least three microphones.

According to a fourth aspect there is provided an apparatus for assisting spatial audio signal processing, the apparatus comprising: capturing circuitry configured to capture, at least using at least three microphones in the apparatus, sensor data comprising microphone audio signals; analysing circuitry configured to analyse the sensor data to determine at least one three-dimension direction of a sound source; and processing circuitry configured to process the sensor data to map the at least one three-dimension direction of the sound source to at least one further direction, wherein the processing of the sensor data is configured to employ at least a parasagittal plane based mapping.

According to a fifth aspect there is provided a computer program comprising instructions [or a computer readable medium comprising program instructions] for causing an apparatus, for assisting spatial audio signal processing, to perform at least the following: capture, at least using at least three microphones in the apparatus, sensor data comprising microphone audio signals; analyse the sensor data to determine at least one three-dimension direction of a sound source; and process the sensor data to map the at least one three-dimension direction of the sound source to at least one further direction, wherein the processing of the sensor data is configured to employ at least a parasagittal plane based mapping.

According to a sixth aspect there is provided a non-transitory computer readable medium comprising program instructions for causing an apparatus, for assisting spatial audio signal processing, to perform at least the following: capture, at least using at least three microphones in the apparatus, sensor data comprising microphone audio signals; analyse the sensor data to determine at least one three-dimension direction of a sound source; and process the sensor data to map the at least one three-dimension direction of the sound source to at least one further direction, wherein the processing of the sensor data is configured to employ at least a parasagittal plane based mapping.

According to a seventh aspect there is provided an apparatus, for assisting spatial audio signal processing, comprising: means for capturing, at least using at least three microphones in the apparatus, sensor data comprising microphone audio signals; means for analysing the sensor data to determine at least one three-dimension direction of a sound source; and means for processing the sensor data to map the at least one three-dimension direction of the sound source to at least one further direction, wherein the processing of the sensor data is configured to employ at least a parasagittal plane based mapping.

According to an eighth aspect there is provided a computer readable medium comprising program instructions for causing an apparatus, for assisting spatial audio signal processing, to perform at least the following: capture, at least using at least three microphones in the apparatus, sensor data comprising microphone audio signals; analyse the sensor data to determine at least one three-dimension direction of a sound source; and process the sensor data to map the at least one three-dimension direction of the sound source to at least one further direction, wherein the processing of the sensor data is configured to employ at least a parasagittal plane based mapping.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

The following describes in further detail suitable apparatus and possible mechanisms for audio focusing. Audio focusing in practical devices is never perfect. For example errors can be produced because of the limited number of microphones, the location of the microphones on the device, issues with microphone calibration and other practical implementation issues. Focusing to a direction here means focusing to range of directions (space or solid angle) where the focus (or amplification) is typically strongest in or near the centre and gradually the focus strength (or ability to amplify a sound object in a direction relative to other directions) gets weaker going towards the borders of the range. Typically, the borders are defined as the region where focus strength has dropped by 3 dB to 6 dB.

The configuration of a typical mobile device is such that the number and locations of the device's microphones make it only possible to detect audio directions unambiguously in a single plane. This furthermore means that audio signals cannot be focused unambiguously to directions above or below the plane. Even in circumstances where directions can be detected unambiguously above and below the plane there are many situations where focussing audio processing is implemented in the plane. For example, focussing audio processing on the plane only can be implemented because of limitations in processing power, algorithmic complexity, or UI complexity. Furthermore, visual processing often assumes that everything is implemented in a plane for similar reasons. Therefore, detected 3D directions (ambiguous or unambiguous alike) are often mapped to a 2D plane (which is typically a horizontal plane) before processing audio and visuals.

However the mapping of 3D to 2D should be implemented differently for different use cases. For example, in visual use situations the mapping from 3D to 2D should be implemented so that the azimuth of the 3D and 2D mapped direction is the same. Also for many audio use cases, specifically for audio focusing, the mapping should be implemented so that the direction in 3D and mapped direction in 2D are on the same parasagittal plane.

Figure 1:
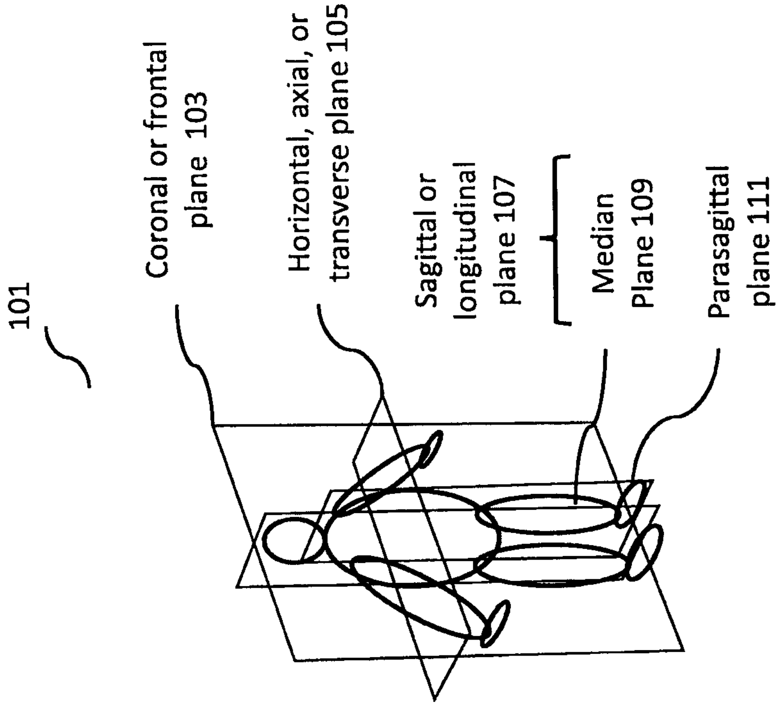
FIG. 1 shows an Illustration of planes with a relationship to a human body (or a device with a camera typically pointing in the same direction as eyes on the body)

With respect to FIG. 1 is shown an Illustration of planes with a relationship to a human body (or similarly for a device with a camera typically pointing in the same direction as the eyes of the body) in order to assist the reader.

Thus, as shown in FIG. 1, the body 101 (or device) is shown located in XYZ space where the cartesian origin 0,0,0 is located at a centre of the body or device (it would be understood that this is a design choice example and the origin can be located at any suitable position) and the eyes or camera is directed along the X+ axis. Furthermore the body of device can be defined relative to a coronal or frontal plane 103 (or a YZ plane located at X=0), the horizontal, axial or transverse plane 105 (or the XY plane located at Z=0) and the sagittal or longitudinal plane 107. The sagittal or longitudinal plane 107 can be the median plane 109 (or XZ plane located at Y=0) or an offset or parasagittal plane 111 (where the plane extends in the XZ axes but with Y<>0).

In some embodiments the device comprises a number of microphones (for example 3 or 4 microphones) and employs azimuth-based 3D to 2D direction mapping for video processing and parasagittal plane-based 3D to 2D audio mapping for audio processing.

Thus the concept, according to some embodiments, relates to audio direction analysis with mobile devices where a method is proposed where the device is configured to select between azimuth and parasagittal plane direction mapping from 3D to 2D depending on the end use for the mapped directions.

For example in some embodiments, for audio processing, the device or method employs parasagittal plane mapping and when sound source direction is visualized employs azimuth mapping.

Hence in some embodiments where the output involves an image then the audio signal processing employed is 'visualisation processing' (using for example azimuth mapping) and where there is only audio output then the audio signal processing is 'audio processing' (using for example parasagittal mapping). In some embodiments any combination is possible from Audio only, video only and audio+video. For example for video then azimuth mapping of source directions can be employed and for audio typically parasagittal mapping of source directions is employed. There can in some situations where audio employs azimuth mapping too, but this is the currently employed mapping processing. There could also be multiple stream or source audio processing, where some employ parasagittal and some azimuth mapping. In some embodiments the implementation of two different mapped directions are advantageous because the azimuth based mapping corresponds to the actual sound object direction where any visualization of the audio sound is expected to be and the parasagittal plane mapping produces an audio processing with better performance results because the delays between microphones from an audio source are (almost) the same in a parasagittal plane. The difference is not the same for 3 or more mics as for 2 mics, the delays are the same in the cone of confusion, where for directions (points on the unit sphere), the cone of confusion corresponds to the intersection of the parasagittal plane and the unit sphere.

Furthermore in some embodiments where the mobile device comprises a number of microphones (for example 3 or 4 microphones) on a plane then the apparatus and methods are configured to employ ambiguous audio 3D directions for processing where sound source cannot be assumed to be near or on the plane and unambiguous audio 2D directions that are mapped from the 3D directions using a parasagittal plane where the sound source can be assumed to be on or near the plane.

For example, in some embodiments the device is configured to select between using audio processing that uses ambiguous or unambiguous audio directions depending on the use case. Typically, use cases where sound source direction can be located significantly outside the plane, the device can be configured to use ambiguous directions and when sound source direction is on or near the plane, unambiguous directions are employed. In some embodiments this can be configured to achieve better sound source separation from background noises.

Figure 2:
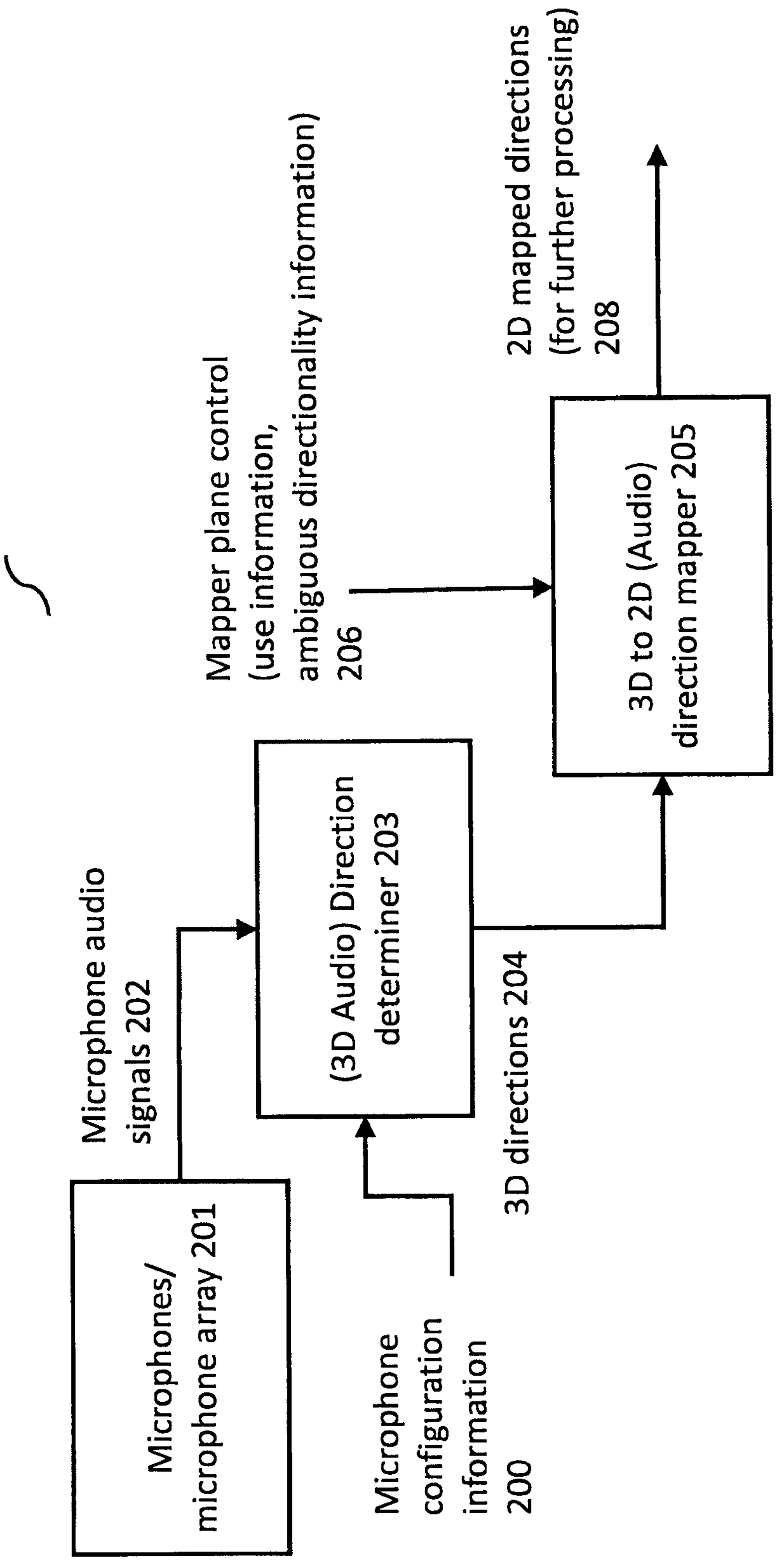
FIG. 2 shows an illustration of time differences between microphone pairs of three microphones on a horizontal plane.

With respect to FIG. 2 is shown a schematic view of an example apparatus suitable for implementing some embodiments. In these embodiments the apparatus or device 200 comprises microphones and/or microphone array(s) 201 which are configured to capture audio signals and pass these to the (3D audio) direction determiner 203.

In the example shown in FIG. 2 the apparatus or device 200 comprises a (3D audio) direction determiner 203. The (3D audio) direction determiner 203 is configured to obtain the microphone audio signals 202 and furthermore microphone configuration information 200 (which can be fixed or preloaded configuration information detailing the separation between the microphones in 3D or can be determined by a device configuration or calibration operation during the device test or use). The direction determiner 203 is configured to detect or determine a sound object direction in 3D (azimuth and elevation).

In some embodiments the sound object direction determiner can be configured to determine the 3D direction by employing additional or other methods. For example in some embodiments the direction determiner is configured to obtain video or image data from at least one camera (or other light based object detection mechanism such as a time-of-flight optical sensor or lidar) and from this data determine the 3D direction (or assist in the audio based 3D direction determination). In some embodiments the object direction determiner is configured to obtain a 3D direction based on a user input indicating a sound object. For example a user interface such as a viewfinder or touch screen display can be used by a user to point or otherwise indicate a direction.

The direction determiner 203 can thus be configured to determine object directions using any suitable methods such as TDOA (Time Difference Of Arrival) for microphone audio signals and face detection for image data.

With respect to microphone audio signal based direction determination (and TDOA), at least 3 microphones are needed. The detected direction may be ambiguous in that the analysis of the data identifies at least two possibilities. For example where there are three microphones on a single, horizontal, plane then a TDOA based analysis of the audio signals can identify two possibilities which have the same azimuth but different elevations (the elevation differs only by the sign of the elevation though).

The 3D direction determiner 203 can then be configured to output the 3D directions 204 to a 3D to 2D direction mapper 205.

In the example shown in FIG. 2 the apparatus or device 200 comprises a 3D to 2D direction mapper 205 configured to obtain the 3D directions and generate and output a mapped 2D direction 208. In some embodiments the 3D to 2D direction mapper 205 is configured to also obtain or receive mapper plane control 206 which is configured to control the method used to map the 3D direction to 2D direction.

In some embodiments the 3D to 2D direction mapper 205 is configured to map the 3D direction to 2D using two different methods.

A first mapping method is an azimuth based method. The azimuth based method simply maps the 3D direction into 2D direction by dropping or ignoring the elevation value. In other words the azimuth value of the direction remains the same.

A second mapping method is a parasagittal plane-based method. The parasagittal plane-based method maps the 3D direction in unit sphere to a direction on a unit circle on a horizontal plane that is on the same parasagittal plane that the 3D direction was on the unit sphere.

The application of the mapping converts ambiguous directions into a single direction after mapping because of symmetry of the situation. In some embodiments as described herein the azimuth-based mapping method can be employed because the method provides the correct visual direction for the sound object. However, the parasagittal-based mapping method is employed because audio processing that uses time differences between microphones 'sees' the same time differences for all source directions that are located on the same parasagittal plane.

Although this is a simplification/generalisation of the situation and the situation further depends on microphone locations the above explanation is a good approximation for devices, such as mobile phones, where the microphones are at (or near) the top and bottom ends of the device (top and bottom here are used with reference to the device in portrait orientation).

Time differences or delays, for example as used in the time difference of arrival direction determination, refer to the fact that because of the finite speed of sound, sound from a sound object arrives at different times to microphones in different locations.

A device or apparatus has their microphones in different known locations. The arrival time difference can thus be used to detect or determine sound object direction with respect to the known microphone locations.

Figure 3A:
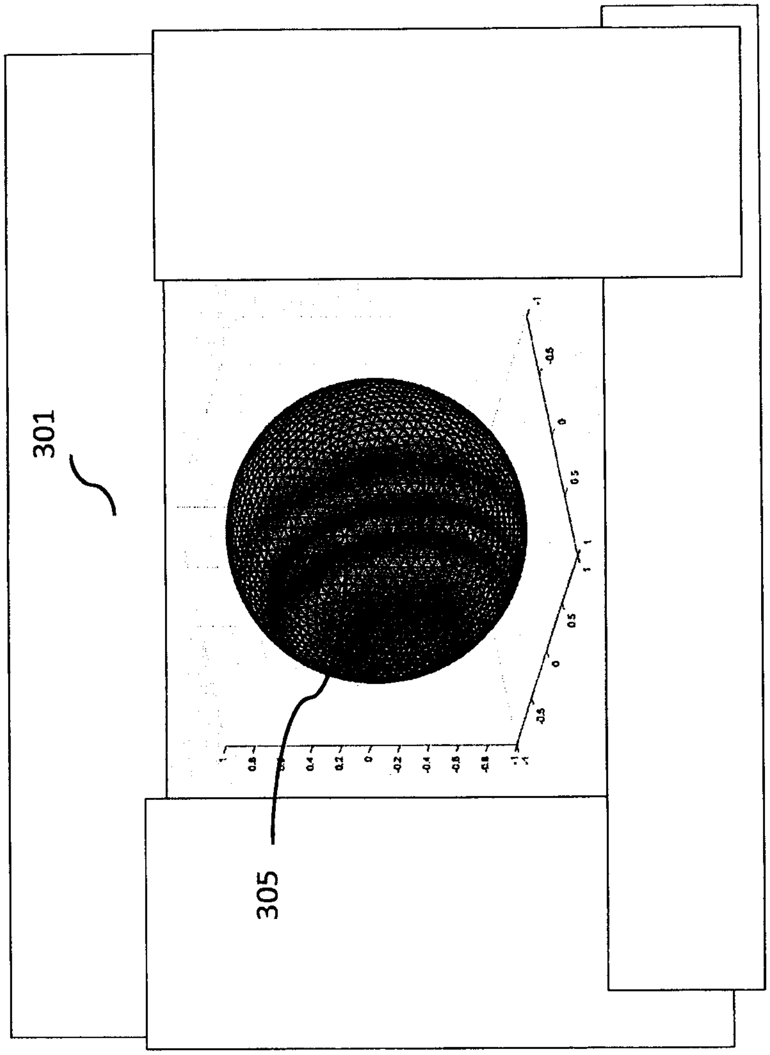
FIG. 3*a* shows schematically time differences for pairs for three microphones on a horizontal plane.

For example, FIG. 3*a* shows a plot 301 (similarity of) time differences for all pairs for three microphones on a horizontal plane. There is a clear high similarity as shown by the shading ring 305 that is on a parasagittal plane. Therefore, methods that use time differences between microphone pairs work similarly on the parasagittal plane.

Figure 3B:
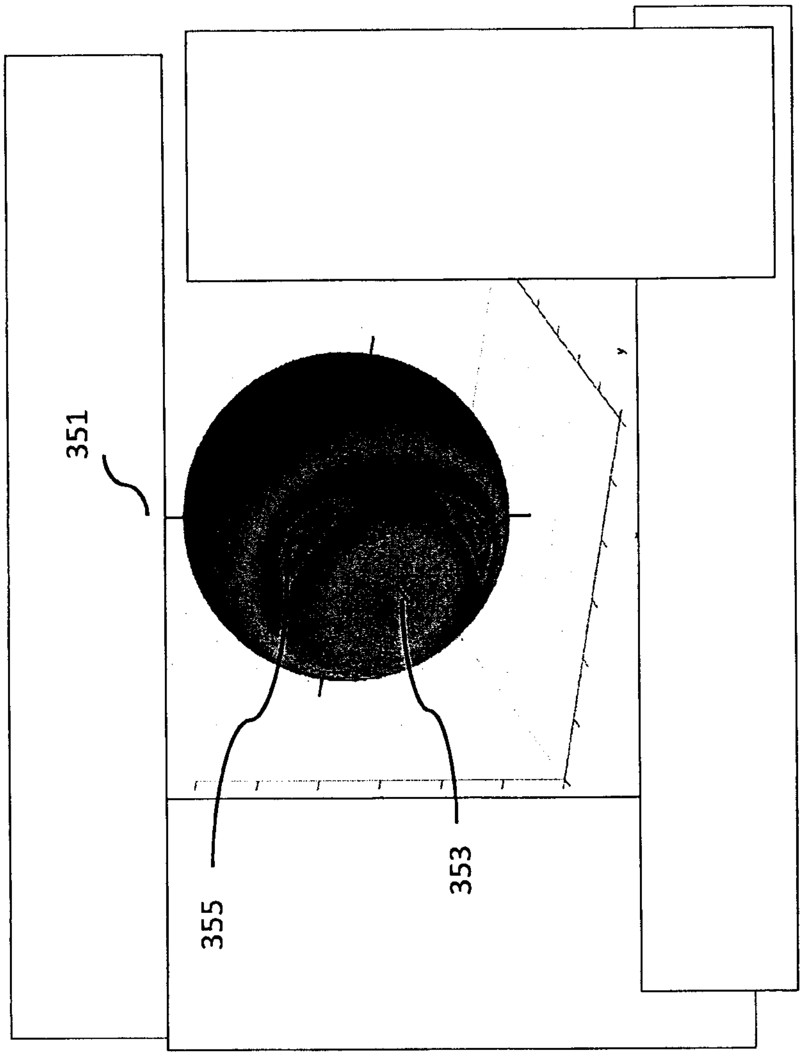
FIG. 3*b* shows beamforming power estimates for an example source.

An example of audio processing is audio focusing which can be implemented using for example Minimum Variance Distortionless Response (MVDR) beamforming. Beamforming uses time differences between microphone signals to focus audio energy or signals to a direction. When the beamformer is pointed towards a direction, the beamformer also amplifies sound sources in other directions that are on the same parasagittal plane. MVDR power estimates for a source is illustrated in FIG. 3*b*. In FIG. 3*b* the power estimates rings 355 which are in the parasagittal plane with respect to the Y-axis 353

2D directions are often employed instead of 3D directions for many reasons: There are fewer 2D directions when a similar spacing between directions is employed, thus computational complexity is lower when using 2D directions. Many databases, for example Head Related Transfer Function (HRTF) databases may only have data for horizontal directions, thus processing with HRTFs can only be implemented using horizontal directions. In low-bitrate audio coding, 2D directions may be used to save bits. Furthermore visualizations are simpler in 2D and easier to understand when they are drawn the same for all elevations.

Figure 4:
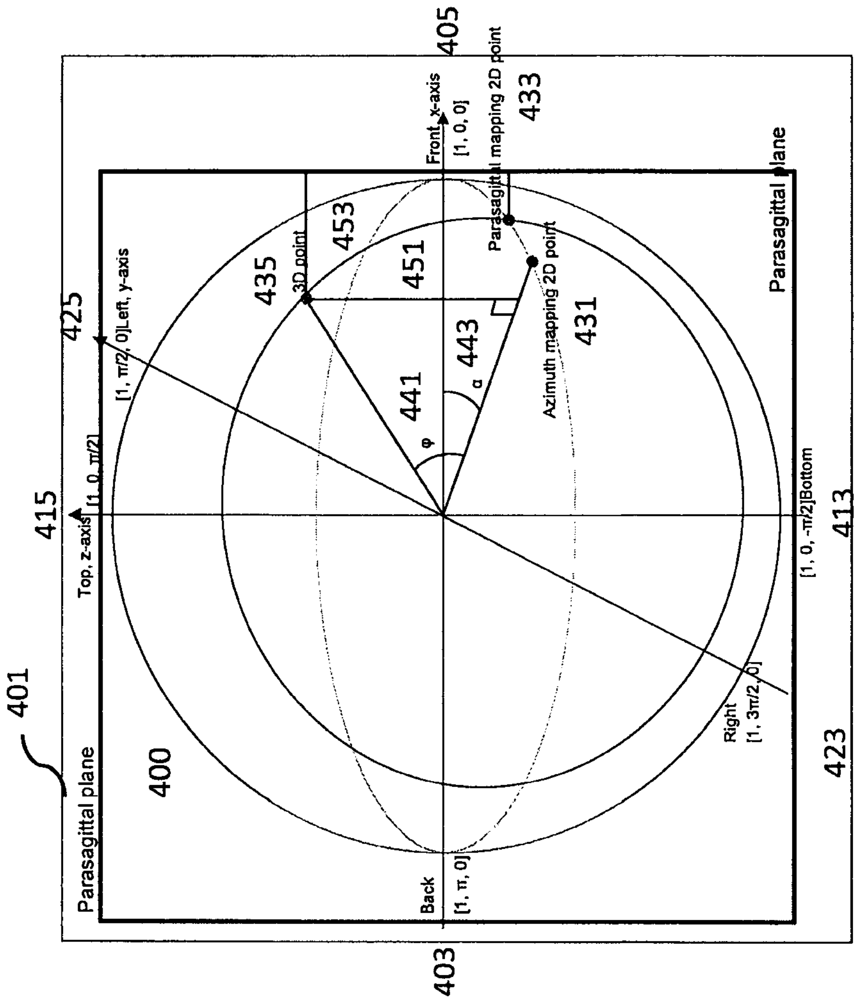
FIG. 4 shows an Illustration of azimuth and parasagittal mapping from 3D to 2D.

FIG. 4 illustrates the difference between azimuth and parasagittal mapping.

The unit sphere 400 is shown which is located with respect to the back 403 and front 405 x-axis, the bottom 413 and top 415 of the z-axis, and the left 425 and right 423 of the y-axis. A 3D direction (or 3D point) 435 is shown which has an elevation φ 441 and azimuth α 443.

Furthermore is shown the azimuth mapping 451 from the 3D direction 435 to the azimuth mapping 2D point 431 where the azimuth value is kept and the elevation value fixed at zero.

Also is shown the parasagittal plane 2D mapping 453 from the 3D direction 435 to the parasagittal mapping 2D point 433 where the 3D point is moved along the parasagittal plane 401 until it intersects with the unit sphere on the horizontal plane.

Figure 5:
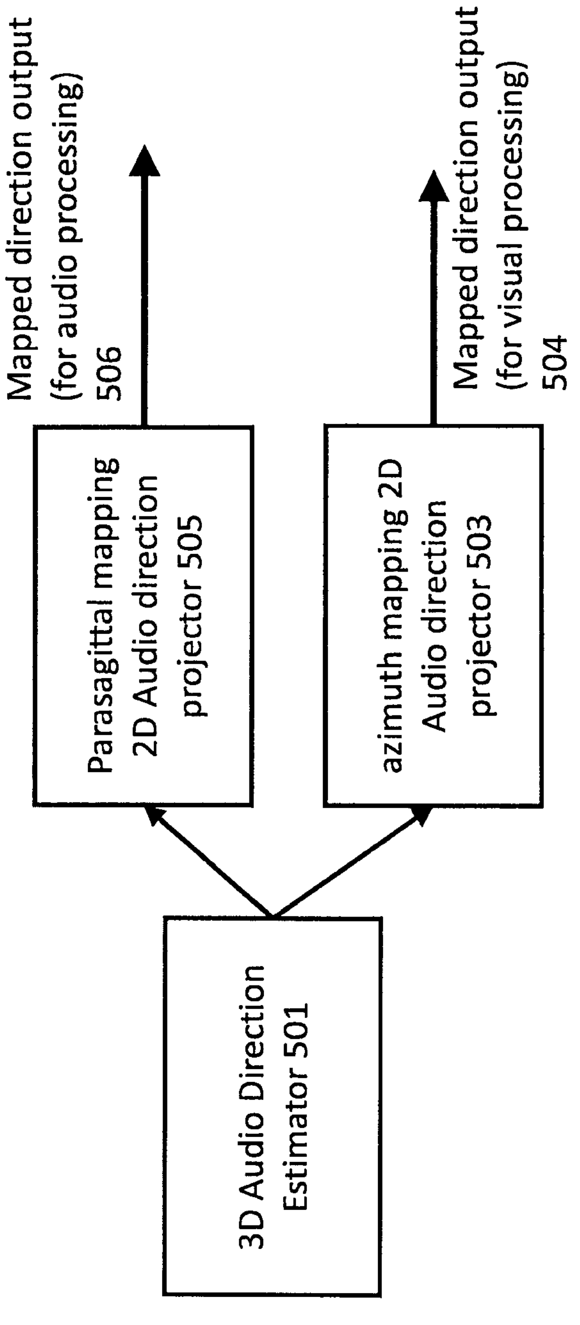
FIG. 5 shows schematically an example focusing apparatus according to some embodiments.

With respect to FIG. 5 is shown the apparatus configured to implement mapping of the 3D directions 204.

In some embodiments the apparatus comprises 3D Audio Direction Estimator 501 configured to determine the 3D point/direction values which are then passed to an azimuth mapping 2D Audio direction projector 503. The azimuth mapping 2D Audio direction projector 503 is configured to receive the 3D audio direction estimates and map these to azimuth mapped 2D points 504. The mapped direction output 504 can then be used for visual processing. Visual processing can, for example, be emphasizing a direction in a video or viewfinder view with a visual effect such as rectangle, circle, saturation, de-saturation, overlayed colour. Video based processing can also mean zooming where the direction is magnified.

The 3D point/direction values can then be passed to a parasagittal mapping 2D Audio direction projector 505 configured to receive the 3D audio direction estimates and map these to parasagittal plane mapped 2D points 506. The mapped direction output 506 can then be used for audio processing.

Thus after the device has mapped the 3D direction to two different 2D direction, the device is configured to process audio and video signals. Audio processing can in some embodiments be an audio signal focusing. In some embodiments a MVDR beamforming or other known beamforming method can be used to focus audio to a direction. Another focusing of the audio signals can be spatial filtering used to focus audio to a direction In some embodiments the processing of audio signals based on the parasagittal mapped 2D directions can be noise cancellation, voice activity detection. For example audio noise cancellation can be used to attenuate noise in other directions than a desired direction. Voice Activity Detection (VAD) may be direction dependent. Audio may be spatialized from the microphone signals to various playback signals such as stereo, binaural, 5.1 etc. Acoustic Echo Cancellation (AEC) may be direction dependent for example so that it updates its parameters mostly for a direction.

The embodiments can thus for visual based processing employ the azimuth mapped 2D direction because this mapping provides a 'correct' direction of the audio object and for audio based processing that use delays between microphones, parasagittal mapped 2D direction is employed. For other audio based processing, the azimuth mapped 2D direction can be used.

An example use case would be an Audio Source Tracking (AST) where sound source directions are detected, automatically tracked, visualized and audio is focused towards a selected sound source.

Figure 6:
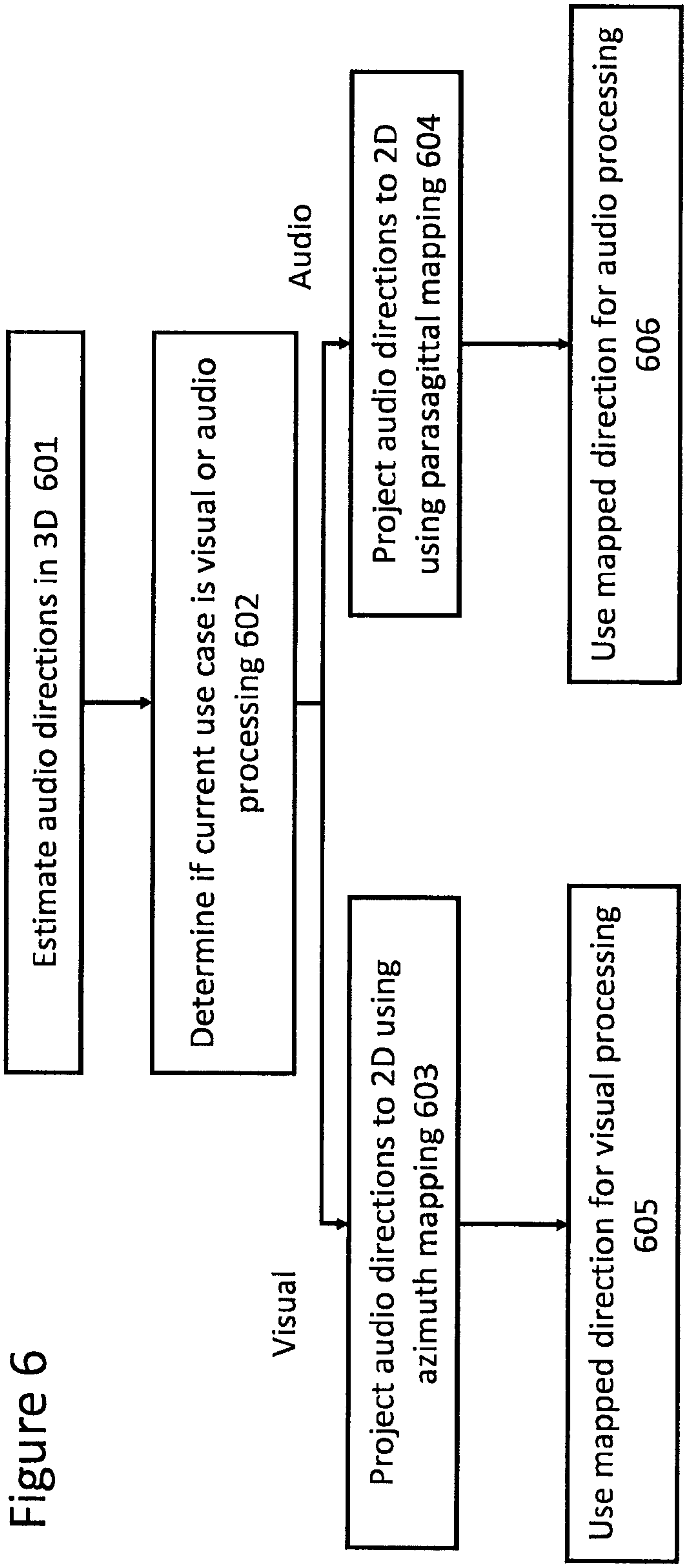
FIG. 6 shows a flow diagram of the operation of the example focussing apparatus as shown in FIG. 5.

With respect to FIG. 6 is shown a flow diagram showing the operations of the example apparatus shown in FIG. 5.

The method comprises estimating audio directions in 3D as shown in FIG. 6 by step 601.

The next operation is one of determining if the current use case is visual or audio processing using the directions as shown in FIG. 6 by step 602.

Where the use case is audio then the 3D directions are then projected to 2D using parasagittal mapping as shown in FIG. 6 by step 604.

The parasagittal mapped 2D directions can then be used for audio based processing as shown in FIG. 6 by step 606.

Where the use case is visual then the 3D directions are then projected to 2D using azimuth mapping as shown in FIG. 6 by step 603.

The azimuth mapped 2D directions can then be used for video based processing as shown in FIG. 6 by step 605.

Typical higher end mobile device has 3 (or some even 4) microphones, in a plane.

Figure 7:
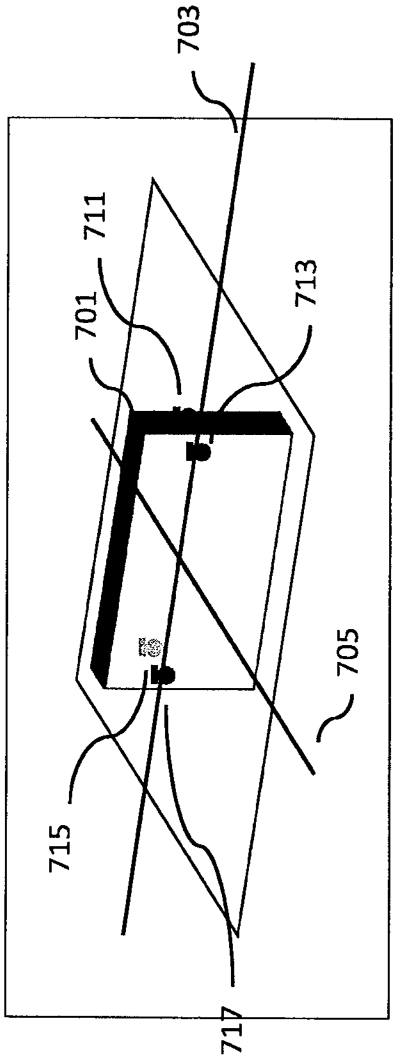
FIG. 7 shows schematically an example single plane arrangement of four microphones on a mobile device according to some embodiments.

With respect to FIG. 7 is shown an example apparatus 701 comprising four microphones 711, 713, 715, and 717 located on a horizontal plane defined by the X-axis 703 and Y-axis 705 and configured such that there are pairs of microphones located on the front and rear faces (as defined by the thin dimension or Y-axis 705) of the apparatus 701 and at opposite ends (as defined by the long dimension or X-axis 703) of the apparatus. For example microphones 717 and 713 can be called the left and right rear microphones and 715 and 711 the left and right front microphones.

Figure 8:
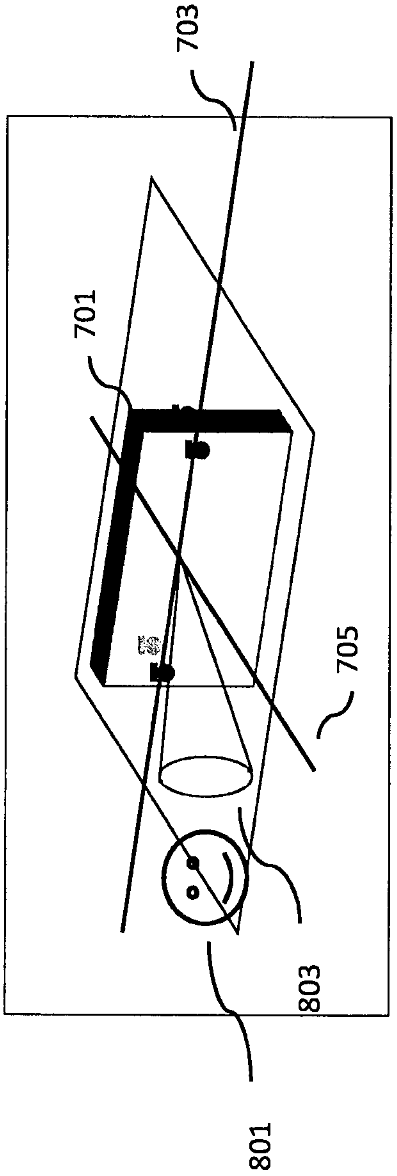
FIG. 8 shows an example unambiguous focussing on the single plane defined by the microphones as shown in FIG. 7.

As shown in FIG. 8 the apparatus is able to only determine a direction/focus audio unambiguously with respect to directions on the (horizontal) plane defined by the microphones. For example a user 801 direction 803 can be determined unambiguously as the direction 803 is on the X-Y plane.

Figure 9:
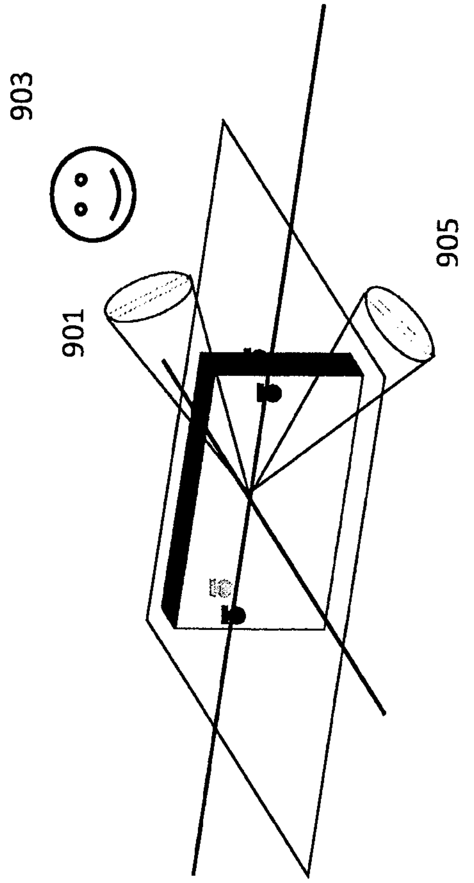
FIG. 9 shows an example ambiguous focussing off the single plane defined by the microphones as shown in FIG. 7.

However where, as shown in FIG. 9, the user 901 is located off the axis then the microphones are only able to focus audio to directions above and below the plane if unambiguous audio focus is used. For example, with beamforming, if a beam is designed using known methods such as MVDR, the device can beam simultaneously to a direction above the plane and its mirrored direction below the plane. Mirroring occurs relative to the plane. An illustration example MVDR data is presented in FIG. 3*b* as described above.

In some embodiments therefore the apparatus and methods are configured to determine a current use case for directions and if the directions are on or near the (horizontal) plane then unambiguous beamforming on the plane is used and if directions are assumed to be anywhere in 3D, then ambiguous beamforming is used.

Figure 10:
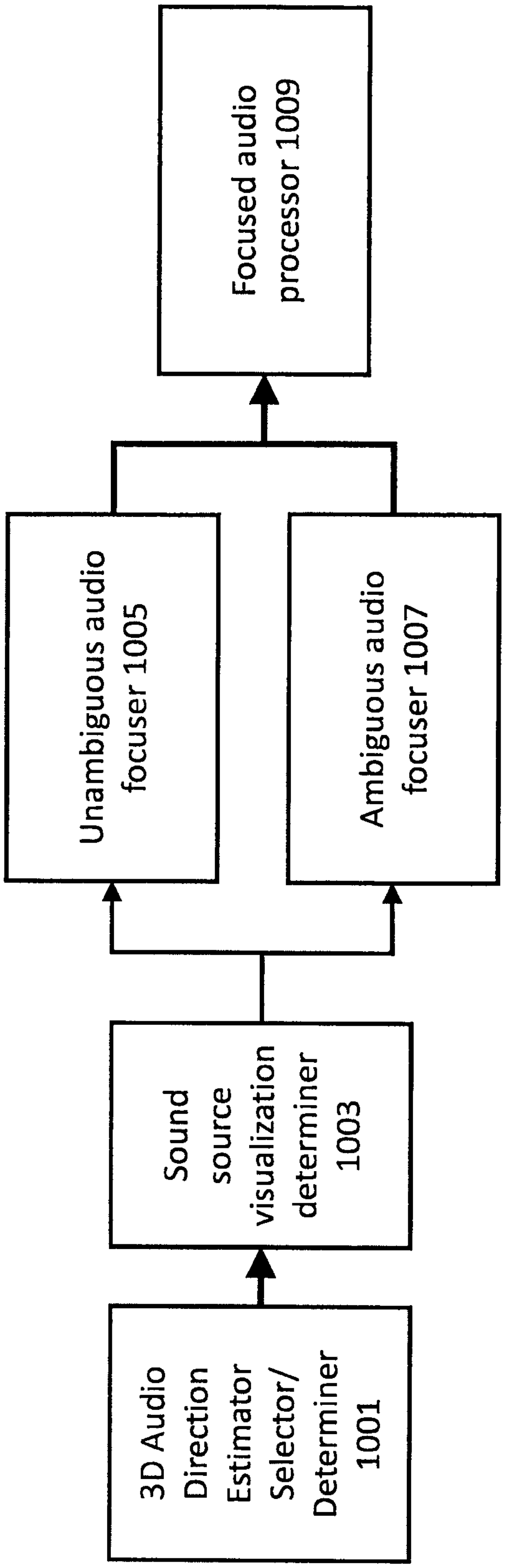
FIG. 10 shows schematically a further example focusing apparatus according to some embodiments.

For example FIG. 10 shows an example apparatus suitable for implementing such embodiments.

The apparatus or device comprises a 3D audio direction determiner 1001 configured to generate the 3D directions. The 3D directions can then be passed to the sound source visualization determiner 1003.

The apparatus, furthermore in some embodiments comprises a sound source visualization determiner 1003 configured to determine if the current use case is configured to visualize sound source directions or not.

The apparatus can furthermore comprise an unambiguous audio focuser 1005 configured to receive the 3D audio direction estimates implement an unambiguous focus processing operation. The unambiguous focus operation can be one where the focus direction is the same azimuth as the 3D audio direction but projected to the horizontal or otherwise defined reference axis. Thus the focus direction is not on the same parasagittal plane as the 3D audio direction. An example of this would be where the 3D direction is determined to be 20 degrees elevation and 30 degrees azimuth (+20, 30) then the unambiguous direction (with respect to the horizonal plane projection) is (0, 30).

The apparatus can furthermore comprise an ambiguous audio focuser 1007 configured to receive the 3D audio direction estimates implement an ambiguous focus processing operation. The ambiguous focus operation can be one where the focus direction is the same azimuth as the 3D audio direction and is on the same parasagittal plane as the 3D audio direction. Thus for example where the 3D direction is determined to be 20 degrees elevation and 30 degrees azimuth (+20, 30) then the ambiguous directions are (+20, 30) and (−20, 30).

The apparatus furthermore can comprise a focused audio processor 1009 configured to receive the output of the focusing (by either the ambiguous or unambiguous audio focuser) and apply the use case processing to the focused audio signals.

Typical use cases where directions are typically on the plane are: video recording, meeting recording, video call or any use cases where directions are visualized to the user such as source tracking as in AST (Audio Source Tracking). Typical use cases where the audio sources can be in any directions are: voice command recognition, voice call.

Figure 11:
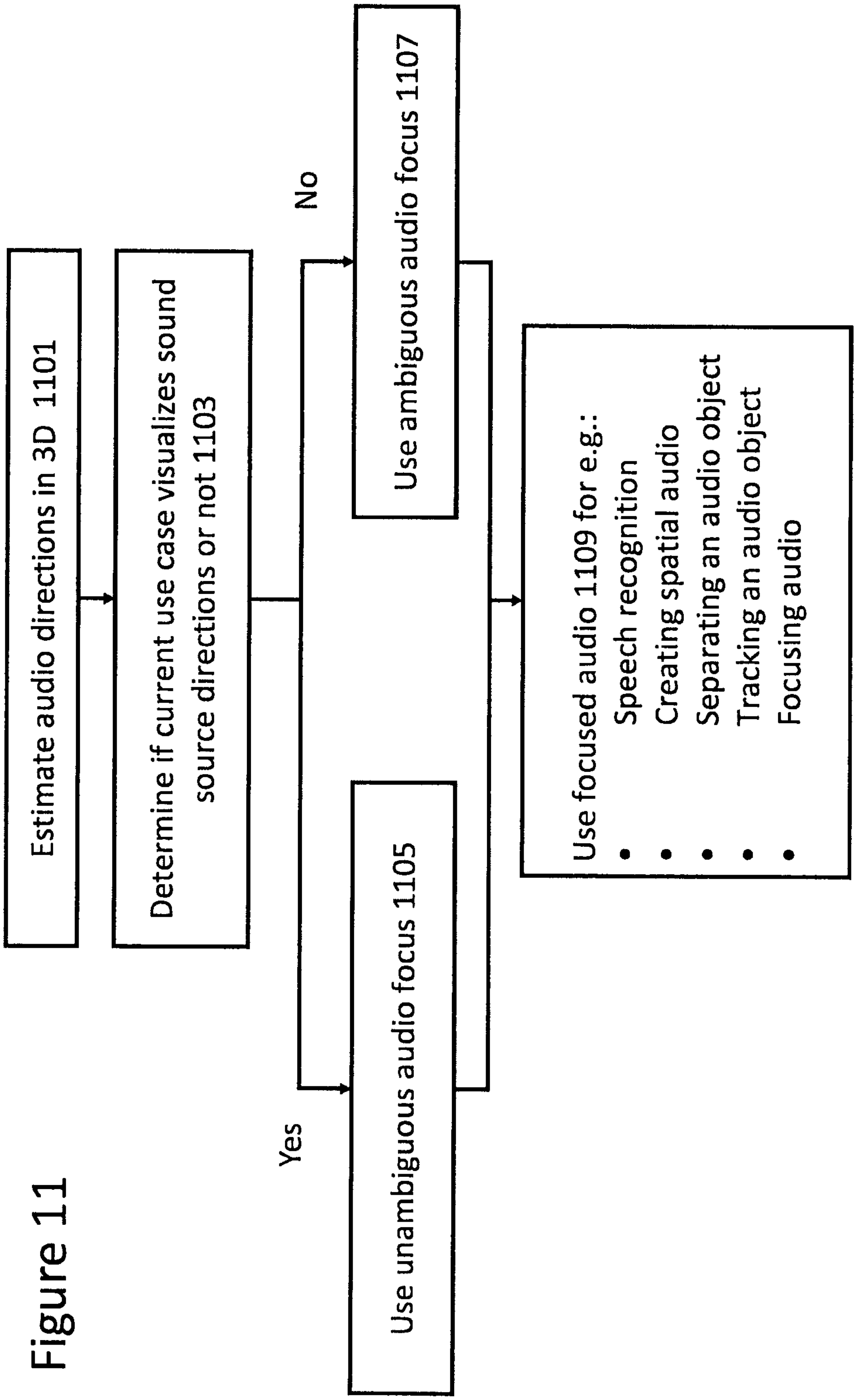
FIG. 11 shows a flow diagram of the operation of the example focussing apparatus as shown in FIG. 11.

FIG. 11 shows a flow diagram describing the operations of the apparatus as shown in FIG. 10.

The method can in some embodiments comprise estimating audio directions in 3D as shown in FIG. 11 by step 1101.

Then the apparatus can be configured to determine if the current use case visualizes sound source directions or not as shown in FIG. 11 by step 1103.

Where the use case visualises the sound source directions then the method is configured to use unambiguous audio focus as shown in FIG. 11 by step 1105.

Where the use case does not visualise the sound source directions then the method is configured to use ambiguous audio focus as shown in FIG. 11 by step 1107.

Having implemented the focussing then the focused audio is employed as shown in FIG. 11 by step 1109.

In some embodiments is also possible that microphones are on a plane because the device is in such an orientation or location that one or more of its microphones are blocked and the remaining microphones are on a plane. For example, the phone may be flat on a table (display up) and a microphone near camera is blocked by the table. The remaining microphones may be on a plane. Alternative, user's hand may block a microphone. Thus in some embodiments the microphone plane is not horizontal, and depends on device microphone locations and obstructions.

In such embodiments the device or apparatus is configured to estimate audio directions in 3D and uses the 3D direction (two mirrored directions) and focuses ambiguously, if the use case is such that sound source directions can be anything. If the sound source directions are assumed to be on a plane the device maps the 3D direction into a 2D direction using parasagittal mapping. If visualizations are used, the device employs azimuth based mapping for the directions.

The embodiments as described above is particularly useful in mobile phone microphone setups where the map is to the parasagittal plane because level and time differences between microphones are more similar for directions that are at the crossing of the parasagittal plane and unit sphere than for other directions. There are many audio processing algorithms which use these differences. Therefore, the processing algorithms require minimal or no change when the direction is mapped along the parasagittal plane compared to any other mapping.

Furthermore although the above has been described with respect to spatial audio signals it would be understood that in some embodiments mono audio signals may be generated or processed from the microphone audio signals.

In some embodiments there can comprise apparatus for assisting spatial audio rendering, the apparatus comprising means configured to: capture, using at least three microphones in the apparatus, sensor data comprising microphone audio signals; analyse the sensor data to determine at least one three-dimension direction of a sound source; and map from the at least one three-dimension direction of the sound source to at least one further direction, wherein the map is configured to employ at least a parasagittal plane map.

In some embodiments the parasagittal plane map is configured to map the at least one three-dimension direction of the sound source to the at least one further direction associated with the sound source on a parasagittal plane common with the at least one three-dimension direction of the sound source.

Furthermore in some embodiments the at least one further direction on the parasagittal plane common with the at least one three-dimension direction of the sound source is at least one of: a three-dimension direction with an elevation value which is a negative of an elevation value of the at least three-dimension direction; a two-dimension direction with a zero elevation value.

The at least one further direction on the parasagittal plane common with the at least one three-dimension direction of the sound source is in some embodiments at least one of: at least one direction defined by an intersection of a parasagittal plane defined by the at least one three-dimension direction with a defined two-dimension plane; and at least one direction defined by an intersection of a sphere with a radius defined by the at least one three-dimension direction and the parasagittal plane defined by the at least one three-dimension direction.

The map is in some embodiments configured to employ an azimuth map.

The azimuth map is in some embodiments configured to map the at least one three-dimension direction of the sound source to the at least one further direction with an azimuth value in common with the at least one three-dimension direction of the sound source.

The at least one further direction with an azimuth value in common with the at least one three-dimension direction of the sound source is, in some embodiments, at least one of: a three-dimension direction with an elevation value which is a negative of an elevation value of the at least three-dimension direction; a two-dimension direction with a zero elevation value.

The means in some embodiments is further configured determine a mode of operation of the apparatus; and the means configured to map the at least one further direction from the at least one three-dimension direction of the sound source, wherein the map is configured to employ at least a parasagittal plane map is configured to select from the parasagittal plane map and the azimuth map to map the at least one further direction from the at least one three-dimension direction of the sound source based on the determined mode of operation of the apparatus.

The means in some embodiments is further configured to process the sensor data using either the at least one further direction or the at least one further direction and the at least one three-dimension direction.

The means configured to capture, using at least three microphones in the apparatus, sensor data is further configured in some embodiments to capture sensor data using at least one camera wherein the sensor data is image data.

The means configured to process the sensor data in some embodiments comprises at least one of: audio processing; and visual processing.

The audio processing in some embodiments comprises audio focusing.

The visual processing in some embodiments comprises enhancing visually the direction.

The further direction in some embodiments is on a plane defined by at least three of the at least three microphones.

The at least one further direction is in some embodiments a horizontal plane.

The apparatus in some embodiments is a mobile phone with the at least three microphones.

Figure 12:
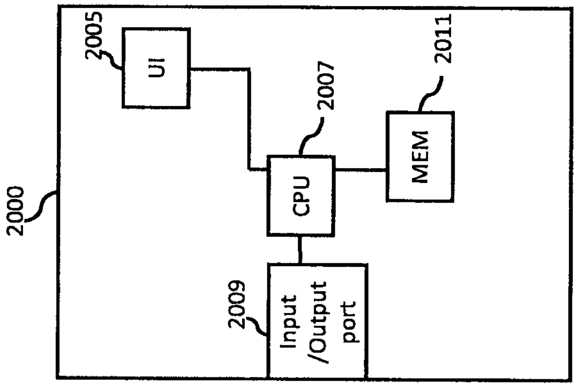
FIG. 12 shows an example device suitable for implementing the apparatus shown in previous Figures.

With respect to FIG. 12 an example electronic device which may be used as any of the apparatus parts of the system as described above. The device may be any suitable electronics device or apparatus. For example in some embodiments the device 2000 is a mobile device, user equipment, tablet computer, computer, audio playback apparatus, etc. The device may for example be configured to implement the encoder or the renderer or any functional block as described above.

In some embodiments the device 2000 comprises at least one processor or central processing unit 2007. The processor 2007 can be configured to execute various program codes such as the methods such as described herein.

In some embodiments the device 2000 comprises a memory 2011. In some embodiments the at least one processor 2007 is coupled to the memory 2011. The memory 2011 can be any suitable storage means. In some embodiments the memory 2011 comprises a program code section for storing program codes implementable upon the processor 2007. Furthermore in some embodiments the memory 2011 can further comprise a stored data section for storing data, for example data that has been processed or to be processed in accordance with the embodiments as described herein. The implemented program code stored within the program code section and the data stored within the stored data section can be retrieved by the processor 2007 whenever needed via the memory-processor coupling.

In some embodiments the device 2000 comprises a user interface 2005. The user interface 2005 can be coupled in some embodiments to the processor 2007. In some embodiments the processor 2007 can control the operation of the user interface 2005 and receive inputs from the user interface 2005. In some embodiments the user interface 2005 can enable a user to input commands to the device 2000, for example via a keypad. In some embodiments the user interface 2005 can enable the user to obtain information from the device 2000. For example the user interface 2005 may comprise a display configured to display information from the device 2000 to the user. The user interface 2005 can in some embodiments comprise a touch screen or touch interface capable of both enabling information to be entered to the device 2000 and further displaying information to the user of the device 2000. In some embodiments the user interface 2005 may be the user interface for communicating.

In some embodiments the device 2000 comprises an input/output port 2009. The input/output port 2009 in some embodiments comprises a transceiver. The transceiver in such embodiments can be coupled to the processor 2007 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The input/output port 2009 may be configured to receive the signals.

In some embodiments the device 2000 may be employed as at least part of the renderer. The input/output port 2009 may be coupled to headphones (which may be a headtracked or a non-tracked headphones) or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus for assisting spatial audio signal processing, the apparatus comprising:
- at least one processor; and
- at least one memory storing instructions that, when executed with the at least one processor, cause the apparatus at least to:
  - capture, at least using at least three microphones in the apparatus, sensor data comprising microphone audio signals;
  - analyse the sensor data to determine at least one three-dimension direction of a sound source; and
  - process the sensor data to map the at least one three-dimension direction of the sound source to at least one further direction, wherein the processing of the sensor data is configured to employ at least a parasagittal plane based mapping.

2. The apparatus as claimed in claim 1, wherein the instructions, when executed with the at least one processor, map the at least one three-dimension direction of the sound source to the at least one further direction associated with the sound source on a parasagittal plane common with the at least one three-dimension direction of the sound source.

3. The apparatus as claimed in claim 2, wherein the at least one further direction on the parasagittal plane common with the at least one three-dimension direction of the sound source is at least one of:

a three-dimension direction with an elevation value which is a negative of an elevation value of the at least one three-dimension direction; or a two-dimension direction with a zero elevation value.

4. The apparatus as claimed in claim 2, wherein the at least one further direction on the parasagittal plane common with the at least one three-dimension direction of the sound source is at least one of:

at least one direction defined with an intersection of a parasagittal plane defined with the at least one three-dimension direction with a defined two-dimension plane; or at least one direction defined with an intersection of a sphere with a radius defined with the at least one three-dimension direction and the parasagittal plane defined with the at least one three-dimension direction.

5. The apparatus as claimed in claim 1, wherein the instructions, when executed with the at least one processor, process the sensor data to employ an azimuth mapping.

6. The apparatus as claimed in claim 5, wherein the instructions, when executed with the at least one processor, configure the azimuth mapping to map the at least one three-dimension direction of the sound source to the at least one further direction with an azimuth value in common with the at least one three-dimension direction of the sound source.

7. The apparatus as claimed in claim 6, wherein the at least one further direction with an azimuth value in common with the at least one three-dimension direction of the sound source is at least one of:

a three-dimension direction with an elevation value which is a negative of an elevation value of the at least one three-dimension direction; or a two-dimension direction with a zero elevation value.

8. The apparatus as claimed in claim 5, wherein the instructions, when executed with the at least one processor, cause the apparatus to determine a mode of operation of the apparatus, process the sensor data to map the at least one three-dimension direction of the sound source to the at least one further direction, and process the sensor data to employ at least the parasagittal plane based mapping to select from the parasagittal plane mapping and the azimuth mapping based on the determined mode of operation of the apparatus.

9. The apparatus as claimed in claim 1, wherein the instructions, when executed with the at least one processor, cause the apparatus to process the sensor data using either the at least one further direction or the at least one further direction and the at least one three-dimension direction.

10. The apparatus as claimed in claim 1, wherein the instructions, when executed with the at least one processor, cause the apparatus to capture, using the at least three microphones in the apparatus, the sensor data using at least one camera, wherein the sensor data further comprises image data.

11. The apparatus as claimed in claim 9, wherein the instructions, when executed with the at least one processor, cause the apparatus to process the sensor data using at least one of:

audio processing; or visual processing.

12. The apparatus as claimed in claim 11, wherein the audio processing comprises audio focusing.

13. The apparatus as claimed in claim 11, wherein the visual processing comprises enhancing visually the at least one three-dimension direction.

14. The apparatus as claimed in claim 1, wherein the at least one further direction is on a plane defined with at least three of the at least three microphones.

15. The apparatus as claimed in claim 1, wherein the at least one further direction is on a horizontal plane.

16. The apparatus as claimed in claim 1, wherein the apparatus is a mobile phone with the at least three microphones.

17. A method for an apparatus for assisting spatial audio signal processing, the method comprising:

capturing, at least using at least three microphones in the apparatus, sensor data comprising microphone audio signals;

analysing the sensor data to determine at least one three-dimension direction of a sound source; and processing the sensor data to map from the at least one three-dimension direction of the sound source to at least one further direction, wherein the processing of the sensor data is configured to employ at least a parasagittal plane based mapping.

18. The method as claimed in claim 17, wherein the parasagittal plane based mapping is configured to map the at least one three-dimension direction of the sound source to the at least one further direction associated with the sound source on a parasagittal plane common with the at least one three-dimension direction of the sound source.

19. The method as claimed in claim 18, wherein the at least one further direction on the parasagittal plane common with the at least one three-dimension direction of the sound source is at least one of:

a three-dimension direction with an elevation value which is a negative of an elevation value of the at least one three-dimension direction; or a two-dimension direction with a zero elevation value.

20. The method as claimed in claim 18, wherein the at least one further direction on the parasagittal plane common with the at least one three-dimension direction of the sound source is at least one of:

at least one direction defined with an intersection of a parasagittal plane defined with the at least one three-dimension direction with a defined two-dimension plane; or at least one direction defined with an intersection of a sphere with a radius defined with the at least one three-dimension direction and the parasagittal plane defined with the at least one three-dimension direction.

21. A non-transitory computer-readable medium comprising instructions stored thereon for performing operations comprising the method of claim 17.

* * * * *